Sept. 3, 1968  E. E. SEILER  3,399,574
METHOD FOR LEAKAGE TESTING OF TANKS
Filed Nov. 23, 1966  2 Sheets-Sheet 1

INVENTOR
ERNST E. SEILER

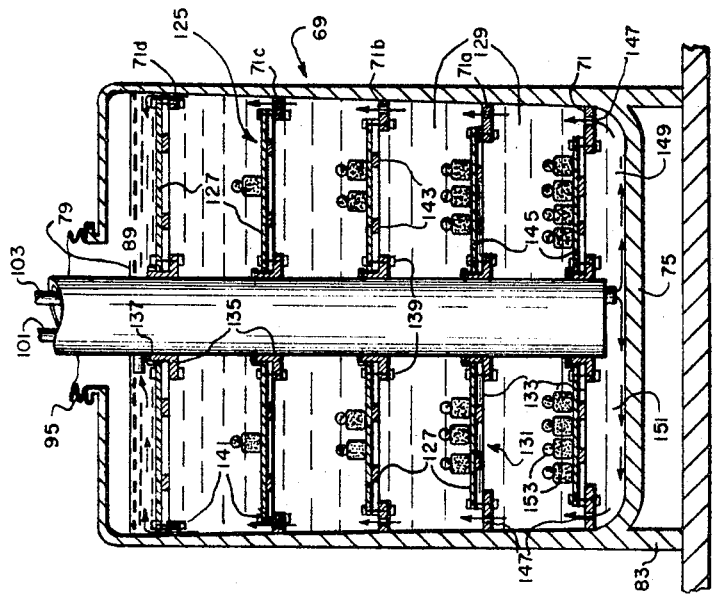

United States Patent Office 3,399,574
Patented Sept. 3, 1968

3,399,574
METHOD FOR LEAKAGE TESTING OF TANKS
Ernst E. Seiler, Madison, Ala., assignor to the United States of America as represented by the Administrator of the National Aeronautics and Space Administration
Filed Nov. 23, 1966, Ser. No. 596,735
7 Claims. (Cl. 73—49.2)

ABSTRACT OF THE DISCLOSURE

A method of testing a large liquid containing tank for leaks by partially filling the tank with an apparatus, such as a piston, that forms alternating relatively narrow and large spaces between the sidewall of the tank and the periphery of the piston. Liquid is pumped through a conduit system against the bottom of the tank and the liquid flows upwardly through the relatively narrow and large spaces thus applying varying leak revealing pressures against the tank sidewall.

---

The invention described herein was made by an employee of the United States Government and may be manufactured and used by or for the Government for governmental purposes without the payment of any royalties thereon or therefor.

This invention relates generally to the testing of tanks for leaks, and more particularly to a method for leakage testing whereby pressures are applied against the interior wall of the tank being tested so as to simulate the pressure conditions existing during actual use of such tank.

An essential and critical operation associated with certain liquid or gas containers is that of testing the container for leaks before the container is put into actual use. This is particularly true with respect to containers employed in flight vehicles, such as propellant tanks for missiles and rockets.

In the case of a propellant tank for a space vehicle the tank must be constructed to withstand, without leakage, not only the ordinary static pressure exerted by the propellant, plus, in some cases, prepressurization of the propellant as by compressed gas, but the tank must also withstand the additional pressure which develops due to g-forces that are exerted during acceleration of the space vehicle after launch. This additional pressure increases in proportion to the acceleration of the vehicle and at maximum acceleration of the vehicle the tank is subjected to its maximum pressure, this pressure being greatest at the bottom of the tank and decreasing gradually toward the top of the tank.

A typical prior method of leakage testing of large propellant tanks for space vehicles is to fill or nearly fill the tank with liquid and apply pressure, as by pressurized gas, for example, to the liquid so that the pressure exerted against the tank bottom will equal or exceed the anticipated maximum pressure exerted on the tank bottom during actual use of the tank, the maximum pressure occurring when the space vehicle reaches maximum acceleration after launch.

While in this method of testing, the desired testing pressure is exerted on the bottom of the tank, the pressure applied to the upper region of the tank greatly exceeds that occurring during flight and needed for testing the upper region. Nevertheless, the upper region of the tank must be made strong enough, and thus heavy and thick enough, to withstand the excessive testing pressure even though such high pressure will not be experienced by the tank upper region during actual use. This is a very undesirable situation, particularly in the case of very large flight vehicle tanks, because it results in the tanks being heavier than is actually required, and, to this extent, reduces the payload and/or speed capabilities of the flight vehicle considerably.

Accordingly, it is a general object of the present invention to provide an improved method for leakage testing of liquid and gas containers.

A more specific object of the invention is to provide in pressure leakage testing of tanks a method for closely simulating the pressure conditions that the tank experiences in flight.

A further object of the invention is to provide a method of leakage testing of large flight vehicle propellant tanks that makes possible a more efficient design of such tanks permitting the use of tanks of reduced weight and, therefore, permitting the increase of the weight of the payload proportionately.

Another object of the invention is to provide a safer method of leakage testing of large tanks by reducing the explosion and flooding hazards attendant to prior testing methods.

These and other objects and advantages of the invention will become apparent upon reference to the following specification, attendant claims and drawings:

FIGURE 3 is a cross-sectional view of a tank being subjected to leakage testing in accordance with a second embodiment of the present invention; and FIGURE 4 is a cross-sectional view of a tank being subjected to leakage testing in accordance with a third embodiment of the invention.

Briefly described, the invention comprises a method of leakage testing of a tank comprising the installation in the tank of an apparatus, referred to hereinafter as a piston, that extends vertically of the tank and is constructed so as to form with the wall of the tank a vertical passage having alternately relatively narrow spaces and relatively large spaces with at least the relatively large spaces being bounded by the tank sidewall. A space is maintained between the bottom of the piston and the bottom of the tank, and liquid is pumped through the piston against the bottom of the tank creating maximum pressure against the bottom of the tank.

The liquid flows from the bottom region of the tank upwardly through the alternating relatively small and large spaces with the rate of flow increasing in the narrow spaces and decreasing in the larger spaces. When the rate of flow increases the fluid pressure decreases and when the rate of flow decreases the fluid pressure increases, thereby changing the pressure against the tank wall according to the rate of flow. Typically, the passage from the bottom to the top of the tank will be designed so that the fluid pressure will decrease in increments from the bottom to the top of the tank so as to closely simulate the pressures applied against the tank bottom and wall under actual use conditions.

Figure 1:
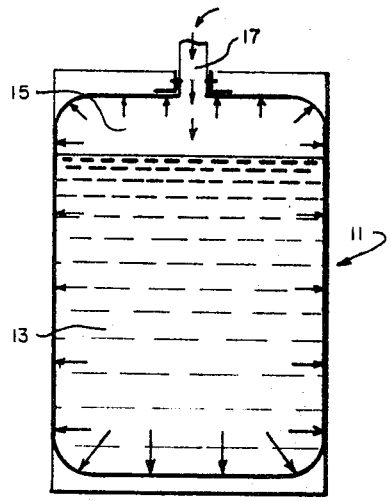
FIGURE 1 is a diagrammatic cross-sectional view of a tank illustrating a typical prior art method of tank leakage testing.

Referring now to FIGURE 1, therein is illustrated schematically a flight vehicle propellant tank 11 being subjected to a leakage test according to a typical prior testing method. A pressure represented by arrows is exerted internally against the walls of the container, the pressure medium being in part a liquid 13 which almost fills the tank. It is understood that without additional pressure the liquid 13 would exert static pressure on the tank bottom and wall, with the static pressure being greatest at the bottom and decreasing gradually toward the top; however, the pressure difference between the top and the bottom of the tank exerted by liquid 13 is not great enough to simulate the pressure that the tank will be experiencing during flight of the vehicle.

As discussed previously, the static pressure exerted by the liquid propellant during flight increases in proportion to the increase in acceleration of the space vehicle, and to simulate this pressure in testing the tank a pressure must be applied against the inside of the tank greater than the normal static pressure of the liquid 13. Therefore, additional pressurizing is needed, and for this reason the tank walls in the upper region must be overdimensioned to withstand the pressure.

According to the prior testing method illustrated in FIGURE 1, the additional pressure is produced by injecting compressed gas 15 through opening 17 into the tank between the surface of the liquid 13 and the top of the tank 11. This additional pressure exerted by the compressed gas 15, although producing the desired testing pressure against the bottom and lower wall region of the tank 11, is a higher pressure than is needed for adequate testing of the top and upper regions of the tank.

Because of this higher pressure, it is necessary to make the top and upper region of the tank heavier and thicker than would be required to withstand the pressure experienced during flight. Moreover, in testing extremely large tanks, such as used as fuel tanks on large space vehicles, the enormous amount of liquid under pressure and the quantity of pressurized gas put into the tank creates explosion hazards and also flooding hazards in case of major failure of the tank. When such a failure occurs, the whole tank ruptures beyond repair, because the entire tank is under high pressure.

Figure 2:
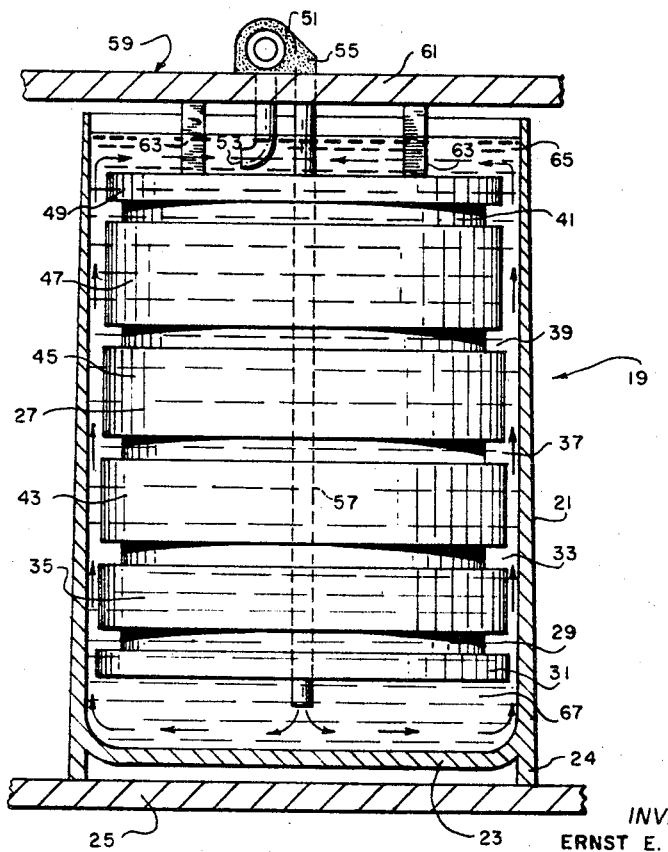
FIGURE 2 is a cross-sectional view of a tank being subjected to leakage testing according to one embodiment of the present invention.

Referring to FIGURE 2, therein is illustrated one embodiment of a method of testing a tank for leakage according to the present invention. A cylindrical open-top tank 19 has a circumferential wall 21, a bottom 23, and a circumferential wall extension 24 extending below the bottom of the tank and resting on a platform 25. Disposed within the tank 19 and occupying a large part of its volume is a piston 27 that has an essentially hollow interior enclosed by a rigid cylindrical shell corresponding generally to the inside of the tank 19 although being somewhat smaller in diameter and of less depth. The shell of the piston 27 may be made of a light, rigid metal such as aluminum or a stiff plastic.

Spaced a relatively short vertical distance from the bottom of the piston 27 is a first annular groove 29 defining a section 31 between the groove 29 and the bottom of the piston. The space between the section 31 and the sidewall 21 of the tank is small relative to the space between the bottom of the groove 29 and the tank sidewall.

Spaced above the groove 29 is a second annular groove 33, defining a section 35 between the groove 29 and the groove 33. The section 35 differs from the section 21 in that its diameter is slightly less than the diameter of the section 31 and its vertical dimension exceeds that of the section 31. Additional grooves 37, 39 and 41 are formed in the piston 27 defining additional sections 43, 45, 47 and 49, each of the sections being slightly less in diameter and sections 43, 45 and 47 being of greater vertical dimension than the next lower section.

The spaces between the sidewall 21 of the tank and the respective sections of the piston 27 are relatively smaller than the spaces between the tank sidewall and the bottoms of the respective grooves. The purpose and effect of these grooves and sections will be discussed hereinafter.

Mounted on top of the piston 27 near the central axis thereof is a pump 51 with an inlet 53 and an outlet 55, the latter merging with and being connected to a tube 57 extending axially through the piston 27 and opening just below the bottom thereof. The piston 27 and its associated pumping apparatus is retained in the tank 19 by an appropriate means such as a yoke 59 comprising frame members 61 bearing on the piston 27 through struts 63, the frame members 61 being well anchored at their ends (not shown).

To test the tank 19 for leaks by applying pressure against the bottom 23 and the vertical circumferential wall 21, a liquid 65 is poured into the tank filling the space around the piston 27 to a level well above the inlet 53 of the pump 51. During operation of the pump 51 the liquid 65 is pumped downwardly through the tube 57 exiting in a space 67 near the bottom of the tank 19. Subsequently, the liquid flows upwardly between the tank wall 21 and the vertical surface of the piston 27 returning to the pump inlet 53 to be recirculated, the circulation of the liquid being indicated by arrows.

The liquid in the space 67 is pressurized to the desired degree by the pump 51 thus exerting the desired amount of testing pressure against the bottom 23 and lower wall of the tank. As it flows upwardly the liquid 65 passes between the tank sidewall 21 and the respective piston sections 31, 35, 43, 45, 47, and 49 and grooves 29, 33, 37, 39, and 41. In the narrow spaces the liquid flows relatively faster in the larger spaces it flows relatively slower thus exerting varying pressures against the tank sidewall. Due to the successively decreasing diameters of the piston sections 31, 35, 43, 45, 47, and 49 and the resultant successive increase in the area of the narrow spaces, the flow velocity required to pass a given amount of liquid through the narrow spaces decreases as the liquid flows upwardly. Therefore, a pressure drop will occur at each of the grooves 29, 33, 37, 39, and 41 so that the pressure in each of the grooves will be less than the pressure in the next lower groove producing an incremental decrease of pressure against the tank sidewall as the liquid flows from the bottom to the top of the tank.

It is understood that the grooves and sections of the piston may be designed and arranged to produce pressure distribution in accordance with the particular testing requirements. It is noted that in FIGURE 2 the tank 19 gradually diminishes in wall thickness from bottom to top since, according to the invention, the testing pressure against various portions of the tank can be controlled to produce testing pressures in proper proportion to actual use pressures experienced by the tank, that is, much higher pressures in the bottom region and little or no pressure in the top region of the tank.

In the embodiment of FIGURE 3 a tank 69 is shown having internal and vertically spaced rings 71–71d that are joined to a tank wall 73 merging with a bottom 75 and a top 77 with the top having a manhole 79 therein. A tank wall extension 83 extends below the bottom 75 resting on a platform 85. Tanks used as propellant tanks in space vehicles commonly have internal slosh baffle rings, such as 71–71d, that gradually decrease in width from the bottom of the tank to the top thereof and present an uneven surface along the inside of the tank wall. Such tanks are often constructed with a manhole such as 79 that can be closed rather expeditiously. The testing apparatus and method of FIGURE 3 is especially conceived for testing a tank with an uneven interior wall and a relatively small opening in the top.

Disposed within the tank 69 is a piston 87 having a hollow rigid axial support column 89 that extends from the bottom of the piston through the manhole 79 being connected as by welding 91 to a yoke 93. If desired to pressurize the top of the tank, a bellows 95 can be installed between the top of the tank and the yoke 93 corresponding in diameter to the manhole 79 and a seat 97 at the yoke 93, thus closing the top of the tank and permitting movement of the tank during pressurization tests.

A pump 99 is mounted at the top of the column 89 and an inlet pipe 101 extends from the pump downwardly inside the column 89 with its open end projecting through the column at top of the piston 87. An outlet pipe 103 is located in the column 89 extending from the pump 99 and ending at the bottom of the piston 87 opening into a space 105 between the bottom of the piston and the tank bottom 75.

In order that the piston 87 may be introduced into and withdrawn from the tank 69 through the manhole 79, an inflatable and collapsible bag 107 is employed, this bag being attached to and carried by the column 89. The bag 107 may be made of a rather strong, flexible material such as tarpaulin or nylon that encircles the column 89 and extends vertically so as to occupy most of the tank when inflated. To give rigidity to the inflated piston so that it will not collapse under the high liquid pressures exerted against it during testing of the tank, the bag 107 contains numerous bladders 109 that are made of a material similar to the bag 107 and are inflated by a system of tubes comprising a main tube 111 disposed lengthwise of the column 89 supplying branch tubes 113 extending laterally through the column 89 from the main tube 111, and tributary tubes 115 branching from the tubes 113 to the individual bladders 109.

Inflation of the bladders 109 by a liquid or gas is by a connection of the main tube 111 to a pump or compressor (not shown) causing inflation of the bag 107 which in FIGURE 3 gradually tapers in diameter from the bottom of the piston to the top thereof so as to correspond with the gradually decreasing widths of the annular rings 71–71d along the inside of the tank. The tapering diameter of the piston is designed to establish narrow passage spaces, such as 119, between the vertical surface of the inflated bag 107 and the edges of the rings 71–71d, it being noted that the area of the narrow slots increases successively from the bottom to the top of the tank due to their increasing diameters.

The operation procedure of the embodiment of FIGURE 3 is in principle the same as the embodiment of FIGURE 2. The piston is introduced into the tank 69 through the manhole 79 with the bag 107 collapsed. The bladders 109 are subsequently inflated, preferably with liquid, through the tube system previously described thus inflating the bag 107 into the predetermined configuration. The tank space around the piston 87 is filled with liquid 121 through the pipe 103, if desired, to a level well above the top of the bag 107.

Circulation of the liquid 121 under force of the pump 99, indicated by arrows, is downwardly through the outlet pipe 103 passing through the space between the bottom of the tank and the bottom of the piston and then upwardly, passing alternately through the respective relatively narrow spaces, such as 119, and relatively large spaces, such as 123, between the rings 71–71d. The pressure exerted by the liquid 121 will be maximum against the bottom of the tank, and decrease incrementally as the liquid flows upwardly through the alternating relatively small and large spaces.

The pressure distribution against the tank wall may be determined by the arrangement and the degree of inflation of the inflatable bag which determines the dimensions of the flow spaces so that testing pressures may be controlled to be in proper proportion to actual flight pressures. In case of rupture of the tank some of the liquid will flow out but most of the liquid will be retained inside the tank, in bladders 109 of FIGURE 3.

As indicated previously, the disclosed testing procedure permits the use of lighter weight fuel tanks for space vehicles, it being noted that the tank 69 has relatively thick and heavy structure at the bottom and lower region and tapering to a thinner and lighter structure at the top.

FIGURE 4 shows another embodiment of the invention wherein the piston comprising the inflatable and collapsible bag 107 of FIGURE 3 is replaced by a piston 125 comprising a series of vertically spaced partitions 127 forming relatively large spaces 129. Otherwise, the arrangement of FIGURE 4 is the same as that of FIGURE 3.

Each of the partitions 127 of FIGURE 4 includes a frame 131 comprising a series of frame members 133 extending radially between the support column 89 and the rings 71–71d. The members 133 are joined to the column 89 through annular angles 135 secure dby screws 137 to the column 89, and the members 133 are connected to the flange 135 by bolts 139. Connection between the frame members 133 and the rings 71–71d is by bolts 141. Struts 143 may be employed as stiffeners between the frame members 133.

Overlying each of the frames 131 and anchored also by bolts 139 and 141 is a flexible skin 145 that may be made of tarpaulin, fabric enforced vinyl or like material. Apertures 147 are provided in the rings 71–71d spaced as needed to form relatively small spaces for liquid to flow at a predetermined rate through the respective partitions. Typically, either the number or size of the apertures 147 in the respective rings will be gradually increased from the bottom ring to the top ring in order to produce a gradual pressure drop in the respective spaces 129.

During operation of the embodiment of FIGURE 4 a liquid 149 is pumped downwardly through the outlet pipe 103 by the pump 99 (FIGURE 3) into a space 151 adjacent the bottom 75 of the tank 69 and then flows upwardly through apertures 147 into respective relatively large spaces 129 between the partitions 127. The pressure exerted by the liquid 149 will be maximum against the bottom 75 of the tank 69 and gradually decrease as the liquid flows upwardly through apertures 147 and the large spaces 129.

The pressure distribution against the tank sidewall may be determined by the arrangement of the partitions 127 and the number and dimensions of the apertures 147 so that testing pressures may be controlled to be in proper proportion to actual flight use. Since the partitions 127 are subjected to very great pressures applied to the underside thereof, weights 153 may be positioned on the upper side of these partitions to give them stability. In case of a major failure of the tank during the test, the flow of the liquid out of the tank will be slackened by the partitions 107, thus reducing the hazards of flooding.

It is seen from the foregoing that the present invention provides a method for leakage testing of tanks whereby the dynamic pressures exerted against the tank can be distributed and controlled in accordance with pressures experienced by the tanks in flight, or other use. The inventive method reduces the hazards of explosion and the hazards of dangerous flooding inherent in prior testing methods.

Obviously many modifications and variations of the present invention are possible in light of the above teachings. It is, therefore, to be understood that within the scope of the appended claims the invention may be practiced other than as specifically described.

What is claimed is:

1. A method of testing a container for leaks comprising:
    (a) forming a fluid passage comprising alternate relatively small and relatively large spaces extending longitudinally of the sidewall of said container with said large spaces being bounded by said sidewall;
    (b) introducing a liquid under pressure into an opening adjacent one end of said container communicating with said passage whereby said liquid flows through said passage exerting a varying pressure against said sidewall of said container;
    (c) said passage being formed so that the areas of said relatively small spaces increases progressively from said opening adjacent one end of said container toward the other end thereof.

2. A method of testing a container for leaks comprising:
    (a) forming a fluid passage comprising alternate relatively small and relatively large spaces, extending longitudinally of the side wall of said container with said large spaces being bounded by said sidewall;
    (b) introducing a liquid under pressure into an opening adjacent one end of said container communicating with said passage whereby said liquid flows through said passage exerting a varying pressure against said sidewall of said container;
(c) recapturing said liquid and recirculating said liquid through said opening and said passage.

3. A method of testing a container for leaks comprising:
(a) forming a fluid passage comprising alternate relatively small and relatively large spaces extending longitudinally of the sidewall of said container with said large spaces being bounded by said sidewall;
(b) introducing a liquid under pressure into an opening adjacent one end of said container communicating with said passage whereby said liquid flows through said passage exerting a varying pressure against said sidewall of said container;
(c) said opening being bounded by the bottom and the sidewall of said container and said liquid being pumped into said opening through a conduit extending substantially axially of said container.

4. A method of testing a container for leaks comprising:
(a) inserting a collapsed bag into said container and subsequently inflating said bag to form a fluid passage comprising alternate relatively small and relatively large spaces extending longitudinally between the sidewall of said container and the periphery of said bag;
(b) introducing a liquid under pressure into an opening adjacent one end of said container communicating with said passage whereby said liquid flows through said passage exerting a varying pressure against said sidewall of said container.

5. The method of claim 4 wherein said container comprises vertically spaced rings secured to the sidewall thereof and wherein said bag is positioned axially of said rings whereby said small spaces are formed between the periphery of said bag and the respective edges of said rings and said large spaces occur between said rings.

6. A method of testing a container for leaks comprising:
(a) forming a fluid passage comprising alternate relatively small and relatively large spaces extending longitudinally of the sidewall of said container with said large spaces being bounded by said sidewall;
(b) said passage being formed by positioning spaced, apertured partitions longitudinally of said container whereby said apertures constitute said relatively small spaces and said spaces between said partitions constitute said relatively large spaces;
(c) introducing a liquid under pressure into an opening adjacent one end of said container communicating with said passage whereby said liquid flows through said passage exerting a varying pressure against said sidewall of said container.

7. A method of testing a container for leaks comprising:
(a) positioning a piston in the container leaving an opening between the bottom surface of said piston and the bottom of said container while forming a fluid passage comprising alternate relatively small and relatively large spaces extending longitudinally of said container with said large spaces being bounded by the sidewall of said container;
(b) pumping liquid into said opening through a vertical conduit incorporated in and extending substantially axially of said piston whereby said liquid flows from said opening through said passage while exerting a varying pressure against said sidewall of said container;
(c) continuously recapturing and recirculating said liquid through said conduit, said opening, and said passage while continuously exerting a varying pressure against said sidewall of said container.

References Cited

UNITED STATES PATENTS 2,399,864   5/1946   Gilch _____ 73—40

DAVID SCHONBERG, *Primary Examiner.*

JEFFREY NOLTON, *Assistant Examiner.*